United States Patent [19]

Nusser et al.

[11] Patent Number: 5,654,410

[45] Date of Patent: Aug. 5, 1997

[54] FIBRE-REACTIVE MONOAZO DYESTUFFS

[75] Inventors: Rainer Nusser, Müllheim, Germany; Roland Wald, Huningue, France

[73] Assignee: Clariant Finance (BVI) Limited, Tortola, Virgin Islands (Br.)

[21] Appl. No.: 699,183

[22] Filed: Aug. 19, 1996

Related U.S. Application Data

[63] Continuation of Ser. No. 431,653, May 2, 1995, abandoned, which is a continuation of Ser. No. 121,716, Sep. 15, 1993, abandoned.

[30] Foreign Application Priority Data

Sep. 17, 1992 [DE] Germany ............... 42 31 143.8
Jan. 9, 1993 [DE] Germany ............... 43 00 404.00

[51] Int. Cl.$^6$ .................. C09B 62/245; C09B 62/085; C09B 62/24; D06P 1/382
[52] U.S. Cl. .................. 534/634; 534/632; 534/635; 534/636; 534/637; 534/638
[58] Field of Search .................. 534/632, 634, 534/635, 636, 637, 638

[56] References Cited

U.S. PATENT DOCUMENTS

| | | | |
|---|---|---|---|
| 3,669,951 | 6/1972 | Bien et al. | 534/638 X |
| 4,840,642 | 6/1989 | Auerbach et al. | 8/549 |
| 5,093,482 | 3/1992 | Schündehütte et al. | 534/632 |
| 5,227,477 | 7/1993 | Auerbach et al. | 534/634 |
| 5,241,056 | 8/1993 | Hoppe et al. | 534/632 |

FOREIGN PATENT DOCUMENTS

| | | | |
|---|---|---|---|
| 0 189 081 | 7/1986 | European Pat. Off. | 534/638 |
| 0 377 189 | 7/1990 | European Pat. Off. | 534/638 |
| 0429997 | 6/1991 | European Pat. Off. | 534/638 |
| 0513617 | 11/1992 | European Pat. Off. | 534/638 |
| 0 513 622 | 11/1992 | European Pat. Off. | 534/632 |
| 0 525 572 | 2/1993 | European Pat. Off. | 534/632 |
| 0 526 792 | 2/1993 | European Pat. Off. | 534/632 |
| 2920949 | 11/1980 | Germany | 534/638 |
| A 37 28 947 | 3/1988 | Germany | 534/638 |
| 517 160 | 8/1968 | Switzerland | 534/638 |
| 2 169 306 | 7/1986 | United Kingdom | 534/63 C |
| 2194953 | 3/1988 | United Kingdom | 534/638 |

OTHER PUBLICATIONS

Lehr, "Synthesis and Application of Reactive Dyes with Heterocyclic Reactive Systems", Dyes and Pigments, vol. 14, (1990), No. 4, pp. 239–263.

*Primary Examiner*—Floyd D. Higel
*Attorney, Agent, or Firm*—Robert S. Honor; Carol A. Loeschorn; Gabriel Lopez

[57] ABSTRACT

Fibre-reactive monoazo compounds of the formula

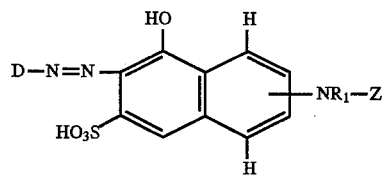

which compounds are in free acid or salt form, and mixtures thereof, are useful for dyeing or printing hydroxy group- or nitrogen-containing organic substrates, for example leather and fibre material comprising natural or synthetic polyamides or natural or regenerated cellulose; the most preferred substrate is a textile material comprising cotton.

11 Claims, No Drawings

FIBRE-REACTIVE MONOAZO DYESTUFFS

This is a continuation of application Ser. No. 08/431,653, filed May 2, 1995, now abandoned, which in turn is a continuation of application Ser. No. 08/121,716, filed Sep. 15, 1993, now abandoned.

This invention relates to fibre-reactive monoazo compounds and processes for their production. These compounds are suitable for use as fibre-reactive dyestuffs in any conventional dyeing or printing processes.

More particularly, the invention provides compounds of formula I

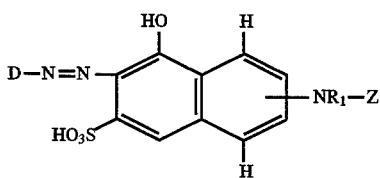

and salts thereof, or a mixture of such compounds or salts, in which each $R_1$ is independently hydrogen, $C_{1-4}$ alkyl or substituted $C_{1-4}$ alkyl, D is one of the radicals (a) to (f),

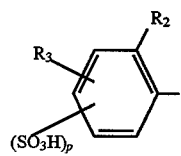 (a)

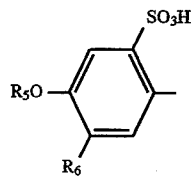 (b)

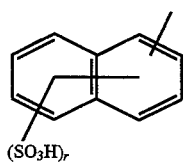 (c)

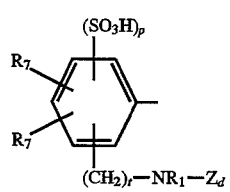 (d)

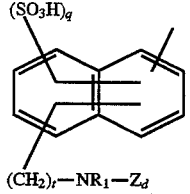 (e)

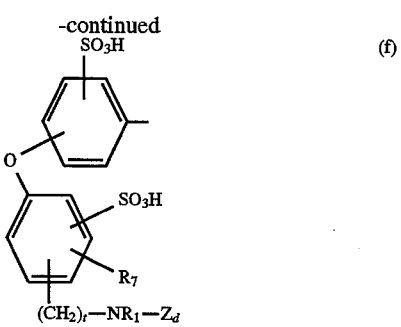 (f)

in which $R_2$ is hydrogen, $C_{1-4}$ alkyl or $C_{1-4}$ alkoxy, $R_3$ is hydrogen, $C_{1-4}$ alkyl, carboxy or —O—$A_1$—$OR_4$, $A_1$ is $C_{2-4}$alkylene, $R_4$ is hydrogen, sulpho, $C_{1-4}$ alkyl or $C_{2-4}$hydroxyalkyl, $R_5$ is $C_{2-4}$alkyl, $R_6$ is hydrogen or sulpho, and each $R_7$ is independently hydrogen, $C_{1-4}$alkyl, $C_{1-4}$alkoxy or carboxy;

each p is 0, 1 or 2, q is 1 or 2, r is 1, 2 or 3, and each t is 0 or 1;

each of Z and $Z_d$ is independently ($z_1$), ($z_2$) or ($z_3$),

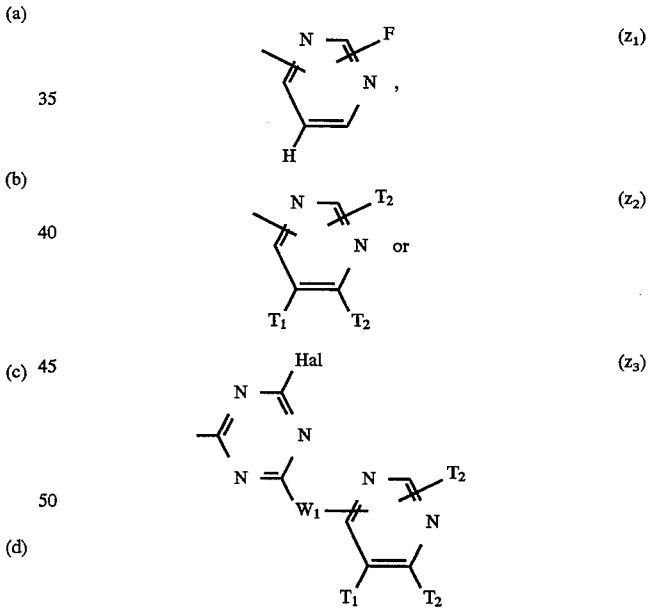

in which $T_1$ is hydrogen, chloro or cyano, the two $T_2$'s are the same and each $T_2$ is fluoro or chloro, Hal is fluoro or chloro, and $W_1$ is —$NR_1$—$B_1$—$NR_1$—,

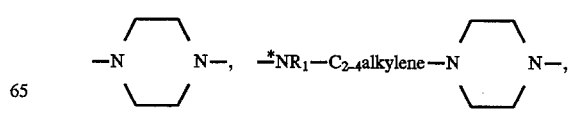

-continued

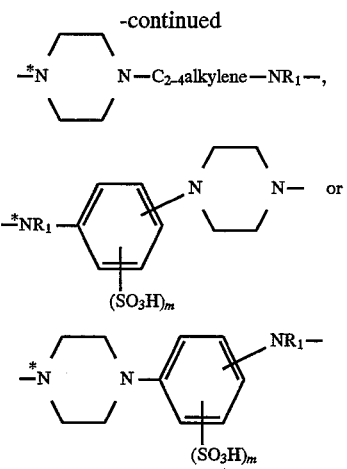

wherein each m is independently 0 or 1 and the marked nitrogen atom is bound to a carbon atom of the triazine ring, $B_1$ is $C_{2-4}$alkylene; —$C_{2-3}$alkylene-Q—$C_{2-3}$alkylene- in which Q is —O— or —$NR_1$—; $C_{3-4}$alkylene monosubstituted by hydroxy,

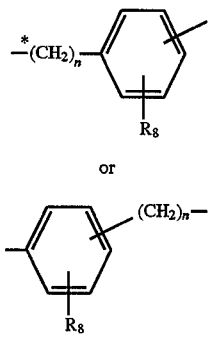

in which n is 0 or an integer 1 to 4, $R_8$ is hydrogen, $C_{1-4}$alkyl, $C_{1-4}$alkoxy, carboxy or sulpho, and the marked carbon atom is attached to the —$NR_1$ group which is bound to a carbon atom of the triazine ring;

with the provisos that (i) Z is 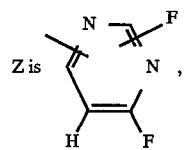

when D is a radical (a) or (c);

(ii) Z is ($z_1$) or ($z_2$), when D is a radical (b); and (iii) each of Z and $Z_1$ is independently ($z_2$) or ($z_3$), when D is a radical (d), (e) or (f), and at least one of Z and

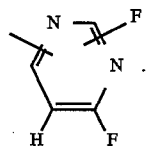

In the specification, any alkyl, alkoxy or alkylene group present is linear or branched unless indicated otherwise. In any hydroxysubstituted alkyl or alkylene group which is attached to a nitrogen atom, the hydroxy group is preferably bound to a carbon atom which is not directly attached to the nitrogen atom. In any alkylene chain interrupted by Q which is attached to a nitrogen atom, Q is preferably bound to a carbon atom which is not directly attached to the nitrogen atom.

When $R_1$ is a substituted alkyl group, it is preferably monosubstituted by hydroxy, cyano or chloro.

Each $R_1$ is preferably $R_{1a}$, where each $R_{1a}$ is independently hydrogen, methyl, ethyl or 2-hydroxyethyl; more preferably each $R_1$ is $R_{1b}$, where each $R_{1b}$ is independently hydrogen or methyl. Most preferably each $R_1$ is hydrogen.

$R_2$ is preferably $R_{2a}$, where $R_{2a}$ is hydrogen, methyl or methoxy.

$A_1$ is preferably $A_1'$, where $A_1'$ is $C_{2-3}$alkylene.

$R_4$ is preferably $R_{4a}$, where $R_{4a}$ is hydrogen, sulpho, methyl, ethyl or $C_{2-3}$hydroxyalkyl. More preferably, $R_4$ is $R_{4b}$, where R4b is hydrogen, sulpho or 2-hydroxyethyl.

$R_3$ is preferably $R_{3a}$, where $R_{3a}$ is hydrogen, methyl, carboxy or —O—$A_1'$—$OR_{4a}$; more preferably it is $R_{3b}$ where $R_{3b}$ is hydrogen, methyl or —O—$A_1'$—$OR_{4b}$.

$R_5$ is preferably $R_{5a}$, where $R_{5a}$ is $C_{2-3}$alkyl; most preferably $R_5$ is ethyl.

$R_6$ is preferably hydrogen.

Each $R_7$ is preferably $R_{7a}$, where each $R_{7a}$ is independently hydrogen, methyl or methoxy.

Hal is most preferably chlorine.

$R_8$ is preferably $R_{8a}$, where $R_{8a}$ is hydrogen, methyl, methoxy, carboxy or sulpho; more preferably it is $R_{8b}$, where $R_{8b}$ is hydrogen or sulpho.

$B_1$ is preferably $B_{1a}$, where $B_{1a}$ is $C_{2-3}$alkylene, —$CH_2CH_2$—O—$CH_2CH_2$—, —$CH_2CH_2$—$NR_{1a}$—$CH_2CH_2$—, monohydroxy-substituted $C_{3-4}$alkylene,

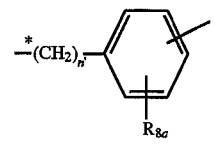

or

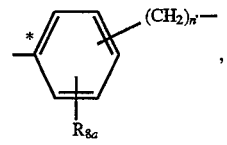

in which n' is 0 or 1.

$B_1$ is more preferably $B_{1b}$, where $B_{1b}$ is $C_{2-3}$alkylene, —$CH_2CH_2$—$N_{1b}$—$CH_2CH_2$—, —$CH_2CH(OH)CH_2$— or

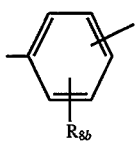

$B_1$ is most preferably $B_{1c}$, where $B_{1c}$ is —CH$_2$CH$_2$—, —CH$_2$CH$_2$CH$_2$—, —*CH$_2$CH(CH$_3$)— or —CH$_2$CH(OH)CH$_2$—, in which the marked carbon atom is bound to the —NR$_1$ group which is attached to a carbon atom of the triazine ring.

$W_1$ is preferably $W_{1a}$, where $W_{1a}$ is —NR$_{1a}$—B$_{1a}$—NR$_{1a}$—,

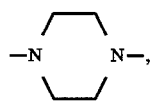

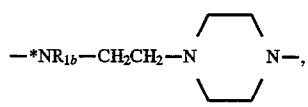

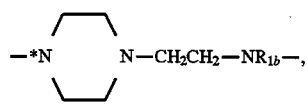

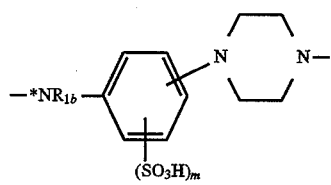

or

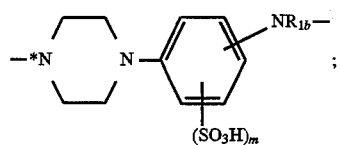

more preferably it is $W_{1b}$, where $W_{1b}$ is —NR$_{1b}$—B$_{1b}$—NR$_{1b}$— or

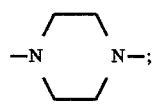

most preferably $W_1$ is $W_{1c}$, where $W_{1c}$ is —NH—B$_{1c}$—NH—.

($z_2$) is preferably ($z_2'$) or ($z_2''$) of the formulae

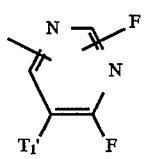

or

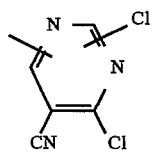

in which $T_1'$ is hydrogen or chloro.

($z_3$) is preferably ($z_3'$) of the formula

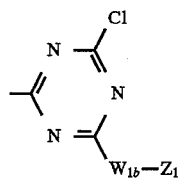

in which $Z_1$ is a radical ($z_2$);
more preferably it is ($z_3''$) of the formula

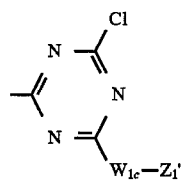

in which $Z_1'$ is a radical ($z_2'$) or ($z_2''$).

(a) is preferably (a') of the formula

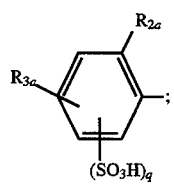

more preferably, $R_{3a}$ in (a') is $R_{3b}$;
(b) is preferably (b') of the formula

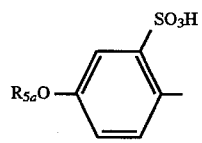

in which $R_{5a}$ is most preferably ethyl;
(c) is preferably (c') of the formula

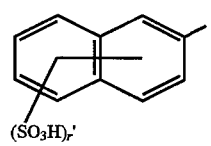

in which r' is 2 or 3;
(d) is preferably (d') of the formula,

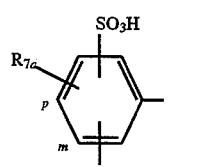

in which the radical —(CH$_2$)$_r$—NR$_{1b}$—Z$_d'$ is in the meta- or para-position to the azo group, (e) is preferably (e') of the formula,

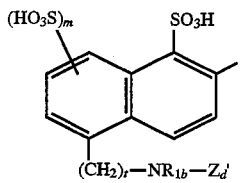

and (f) is preferably (f') of the formula,

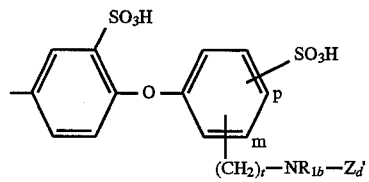

in which the radical —$(CH_2)_t$—$NR_{1b}$—$Z_d'$ is in the meta- or para-position to —O—, in which radicals (d') to (f') $Z_d'$ is a radical ($z_2$) or ($z_3'$). Most preferably, $Z_d'$ in a radical (d'), (e') or (f') is $Z_d''$, where $Z_d''$ is a radical ($z_2'$), ($z_2''$) or ($z_3''$).

Preferred compounds of formula I correspond to formulae Ia, Ib and Ic, and salts thereof,

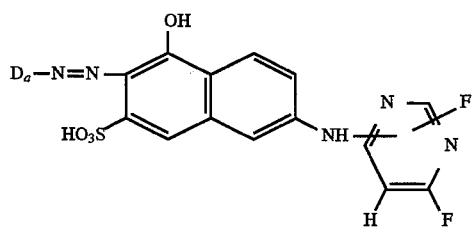

in which $D_a$ is a radical (a') or (c'). More preferred are compounds of formula Ia, in which in (a') $R_3a$ is $R_{3b}$;

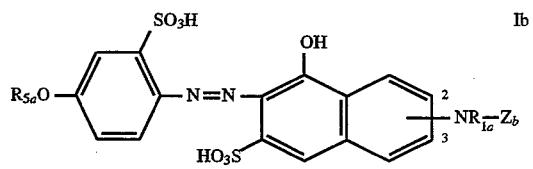

in which $Z_b$ is a radical ($z_1$) or ($z_2$), and the radical —$NR_{1a}$—$Z_b$ is in the 2- or 3-position of the naphthyl ring. More preferred are compounds of formula Ib in which (1) $R_{1a}$ is $R_{1b}$;
(2) those of (1) in which $R_{1b}$ is hydrogen;
(3) $R_{5a}$ is ethyl;
(4) those of (1) to (3) in which the radical —$NR_{1a}$—$Z_b$ is in the 3-position of the naphthyl ring;
(5) those of (1) to (4) in which

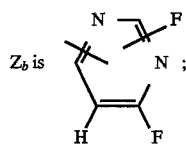

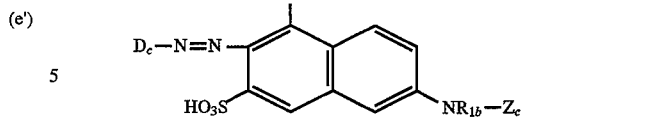

in which $D_c$ is a radical (d'), (e') or (f') and $Z_c$ is ($z_2$) or ($z_3'$); with the proviso that at least one of $Z_d'$ and

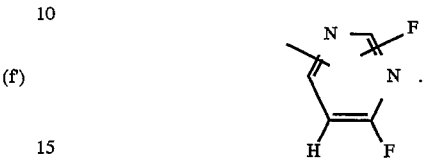

More preferred are compounds of formula Ic in which
(1) $R_{1b}$ is hydrogen;
(2) $Z_c$ is $Z_c'$ where $Z_c'$ is a radical ($z_2'$), ($z_2''$) or ($z_3''$);
(3) $Z_d'$ in (d') (e') and (f') is $Z_d''$;
(4) one of $Z_d'$ and

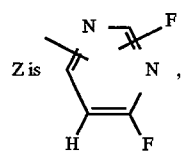

and the other is a radical ($z_3'$);
(5) those of (4) in which ($z_3'$) is ($z_3''$).

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri- ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds according to formula I or mixtures thereof, comprising reacting the diazonium salt of an amine of formula II,

D—$NH_2$     II in which D is as defined above, with a compound of formula III

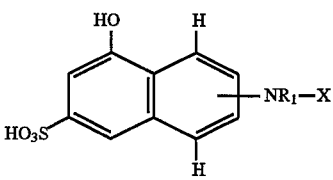

in which $R_1$ is as defined above, and X is hydrogen or a radical Z, and in case where X is hydrogen, subsequently reacting the coupling product obtained with a compound of formula Z-Hal in which Hal is fluoro or chloro.

Compounds of formula I in which D is a radical (d), (e) or (f), and Z and $Z_d$ are both Z is 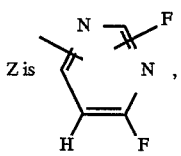

may also be prepared by reacting 1 mole of a compound of formula IV,

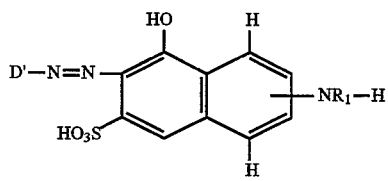    IV in which $R_1$ is as defined above, and D' is a radical

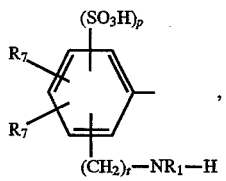,

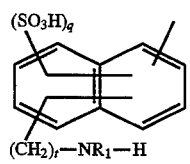

or

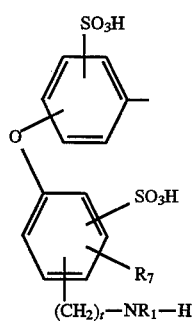

with at least two moles of 2,4,6-trifluoropyrimidine.

Diazotisation and coupling may be carried out in accordance with conventional methods; the coupling reaction is preferably carried out in a pH range of from 6.5–8.5, especially at pH 7–8.

The condensation of an amino group with a compound of formula Z-Hal (including 2,4,6-trifluoropyrimidine) is suitably carried out at a slightly elevated temperature in the range of from 35°–60° C., and at a pH of 4–6.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that any group Z or $Z_d$ which is a monofluoropyrimidinyl radical or a radical (z2) corresponding to the formulae

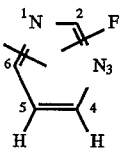

or

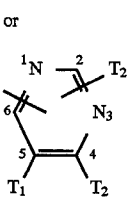

can occur in two isomeric forms, with the floating fluoro or chloro substituent in either the 2- or the 6-position.

In general, it is preferred to use this mixture of resulting dyestuffs as it is without resorting to the isolation of a single isomer for use, but should this be desired it can be readily achieved by conventional methods.

The starting compounds of the formulae II, III and IV and also Z-Hal are either known or may be readily made from known starting materials by known methods using conventional diazotising, coupling and/or condensation reactions.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of 30° to 80° C., particularly at 50°–60° C., whereby a liquor to goods ratio of 6:1 to 30:1 is used and more preferably of 10:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

The following examples illustrate the invention. In the examples all parts and percentages are by weight unless indicated to the contrary, and all temperatures are given in degrees Centigrade.

EXAMPLE 1

47.8 Parts of 2-amino-5-hydroxynaphthalene-7-sulphonic acid are suspended in 500 parts of water at 25° and are dissolved by adding 30% sodium hydroxide solution. To the resultant solution, 19.4 parts of 2,4,6-trifluoropyrimidine are added. The pH of the reaction mixture is kept at 4.4–4.8 by adding 20% sodium carbonate solution continuously, and the temperature is simultaneously increased to 40°–45°. Stirring is effected until the reaction is complete whereby from time to time the course of the reaction is monitored by thin layer chromatography.

The suspension thus obtained is added all at once at 0°–5° to a diazonium salt solution which has been prepared in a conventional manner from 43.4 parts of 3-amino-4-methoxy-5-methylbenzene sulphonic acid. The pH of the reaction mixture is kept at 7.2–7.5 by the addition of 20% sodium carbonate solution. After the coupling reaction is completed, the formed dyestuff is salted out with sodium chlqride, filtered off and dried at 50° in vacuo. The dyestuff corresponds to the formula (shown in free acid form),

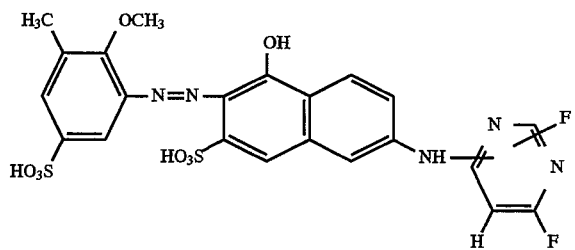

it dyes cotton in orange shades. These cotton dyeings exhibit good light and wet fastness properties and are resistant to oxidative influences.

EXAMPLE 2

28.1 Parts of 2-acetylamino-5-hydroxynaphthalene-7-sulphonic acid are dissolved in 200 parts of water at 25°. To this solution a diazonium salt solution is added at 0°–5° which has been prepared in a conventional manner from 26.0 parts of 1-acetylamino-3-amino-4-methoxybenzene-5-sulphonic acid. The pH of this coupling mixture is held at 8.0–8.5 by the addition of 20% sodium carbonate solution. After the reaction is complete, the azo dyestuff thus obtained is salted out by adding sodium chloride and filtered with suction.

The moist filter residue is dissolved in 300 parts by volume of 4% sodium hydroxide solution. The solution is refluxed at 90°–100° until the saponification of the acetamido groups is complete (which has to be monitored by thin layer chromatography). The reaction mixture is then cooled to 20° and the pH is adjusted to 4.3–4.8 by adding 30% hydrochloric acid. Subsequently, 26.8 parts of 2,4,6-trifluoropyrimidine are added. The pH of the mixture is kept at 4.3–4.8 by the continuous addition of 20% sodium carbonate solution, and the temperature is increased to 40°–45°. After the reaction is complete, the dyestuff is salted out by adding sodium chloride, filtered and dried at 50° in vacuo. It corresponds to the formula (shown in free acid form)

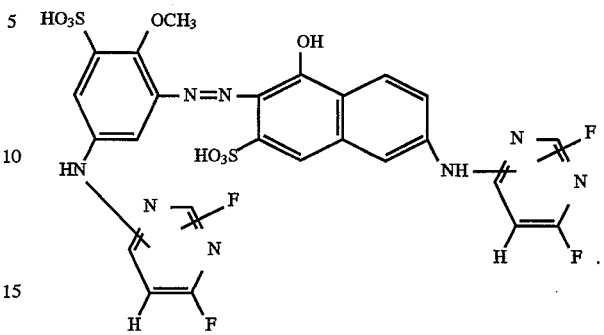

With this dyestuff scarlet dyeings and prints on contton are obtained which show excellent properties with respect to light fastness and wet fastness and are resistant to oxidative influences.

EXAMPLES 3 TO 96

By analogy with the method described in Example 1 or 2, using appropriate starting compounds, further compounds of formula I may be prepared which are listed in the following Tables 1 to 4. They correspond to the formulae (T1), (T2), (T3) and (T4) as follows:

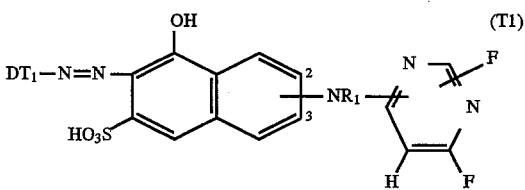

for Table 1;

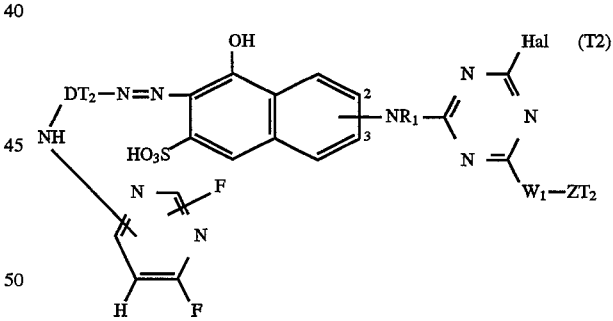

for Table 2;

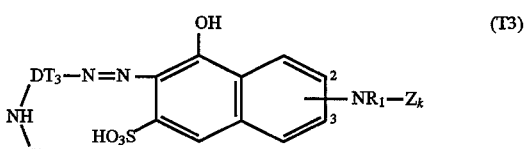

for Table 3; and

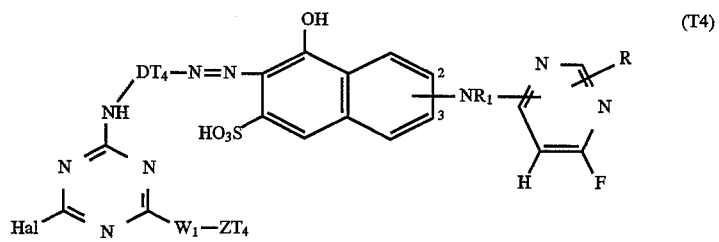

(T4)

for Table 4
in which the symbols are as defined in Tables 1 to 4.

The compounds of Examples 3 to 96 may be applied to substrates which comprise cellulose fibres, and particularly to textile material comprising cotton using the conventional exhaust dyeing method or conventional printing processes, where dyeings or prints in orange to scarlet shades are obtained. These dyeings and prints on cotton show good properties with respect to light fastness and wet fastnesses and are resistant to oxidative influences.

TABLE 1

Compounds of formula (T1)
Examples 3-27

| Ex. No. | $DT_1$ | position of $-NR_1-$ | $R_1$ |
|---|---|---|---|
| 3 | 4-OCH₃, 5-CH₃, 1-SO₃H phenyl | 3 | H |
| 4 | 2,5-disulfophenyl | 3 | $CH_3$ |
| 5 | 2-CH₃, 4,5-disulfophenyl | 3 | H |
| 6 | " | 2 | H |
| 7 | 2-SO₃H, 4-CH₃, 5-SO₃H phenyl | 3 | H |
| 8 | " | 3 | $CH_3$ |
| 9 | 1-SO₃H, 5-SO₃H naphthyl | 3 | H |
| 10 | " | 2 | H |

TABLE 1-continued

Compounds of formula (T1)
Examples 3-27

| Ex. No. | DT$_1$ | position of $-NR_1-$ | R$_1$ |
|---|---|---|---|
| 11 | naphthalene with SO$_3$H at 1-position, HO$_3$S at 7-position, methyl at 2-position | 2 | H |
| 12 | " | 3 | H |
| 13 | " | 3 | $-CH_2CH_3$ |
| 14 | naphthalene with SO$_3$H at 1-position, HO$_3$S at 7-position, SO$_3$H at 4-position, methyl at 2-position | 3 | H |
| 15 | " | 2 | H |
| 16 | naphthalene with SO$_3$H at 4-position, HO$_3$S at 6-position, SO$_3$H at 7-position, methyl at 2-position | 3 | H |
| 17 | " | 3 | CH$_3$ |
| 18 | naphthalene with SO$_3$H at 4-position, HO$_3$S at 6-position, SO$_3$H at 8-position, methyl at 2-position | 3 | " |
| 19 | " | 2 | H |
| 20 | benzene with HOOC, OCH$_3$, and methyl substituents | 3 | H |
| 21 | " | 2 | H |
| 22 | benzene with HO$_3$S, methyl, and OCH$_2$CH$_2$OH substituents | 3 | H |
| 23 | " | 3 | CH$_3$ |
| 24 | benzene with OCH$_2$CH$_2$OSO$_3$H and methyl substituents | 3 | H |
| 25 | " | 3 | CH$_3$ |

TABLE 1-continued

Compounds of formula (T1)
Examples 3-27

| Ex. No. | DT₁ | position of —NR₁— | R₁ |
|---|---|---|---|
| 26 | 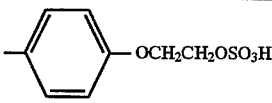 | 3 | H |
| 27 | " | 2 | H |

In Tables 2 to 4 below, the following symbols $ZT_a$, $ZT_b$ and $ZT_c$ are used for $ZT_2$, $Z_d$ and $Z_k$ and $ZT_4$, where

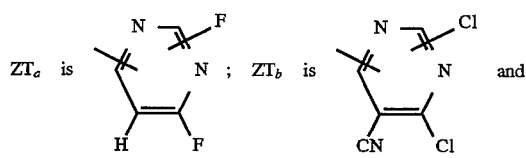 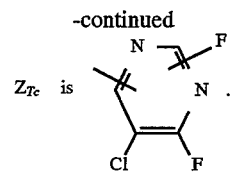

Furthermore, in Table 2 below each marked carbon atom in the column under $DT_2$ is bound to the azo group in formula (T2); and each marked nitrogen atom in the column under —$W_1$— is bound to a carbon atom of the triazine ring in formula (T2).

TABLE 2

Compounds of formula (T2)
Examples 28–53

| Ex. No. | DT₂ | position of —NR₁— | R₁ | Hal | —W₁— | ZT₂ |
|---|---|---|---|---|---|---|
| 28 | HO₃S-[ring]-OCH₃ (with *) | 3 | H | Cl | —NHCH₂CH₂CH₂NH— | ZT_a |
| 29 | " | 3 | H | F | " | " |
| 30 | " | 3 | H | Cl | " | ZT_b |
| 31 | " | 3 | H | Cl | —NHCH₂CHCH₂NH—<br>\|<br>OH | ZT_a |
| 32 | " | 3 | H | Cl | *—NHCH₂CHNH—<br>\|<br>CH₃ | " |
| 33 | " | 2 | H | Cl | " | ZT_b |
| 34 | " | 3 | CH₃ | Cl | *—NHCH₂CH₂CH₂N—<br>\|<br>CH₃ | ZT_a |
| 35 | -[ring]-SO₃H (with *) | 3 | H | Cl | " | " |
| 36 | " | 3 | H | F | —NHCH₂CH₂CH₂NH— | " |
| 37 | " | 2 | H | Cl | " | ZT_c |
| 38 | " | 3 | H | Cl | —NHCH₂CHCH₂NH—<br>\|<br>OH | ZT_a |

TABLE 2-continued

Compounds of formula (T2)
Examples 28–53

| Ex. No. | DT$_2$ | position of —NR$_1$— | R$_1$ | Hal | —W$_1$— | ZT$_2$ |
|---|---|---|---|---|---|---|
| 39 | " | 3 | H | Cl | " | ZT$_b$ |
| 40 | " | 3 | H | Cl | $\overset{*}{-}$NHCH$_2$CHNH— <br> $\quad\quad\quad\quad\quad\;\;$ $\|$ <br> $\quad\quad\quad\quad\quad\;\;$ CH$_3$ | ZT$_a$ |
| 41 | 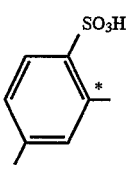 | 3 | H | Cl | " | " |
| 42 | " | 2 | CH$_3$ | Cl |  | " |
| 43 | " | 3 | H | Cl | " | ZT$_b$ |
| 44 | " | 3 | H | Cl | —NHCH$_2$CHCH$_2$NH— <br> $\quad\quad\quad\quad\quad\;\;$ $\|$ <br> $\quad\quad\quad\quad\quad\;\;$ OH | ZT$_a$ |
| 45 | " | 3 | H | Cl | —NHCH$_2$CH$_2$CH$_2$NH— | " |
| 46 | " | 2 | H | Cl | " | ZT$_c$ |
| 47 | 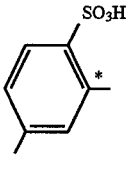 | 3 | H | Cl | $\overset{*}{-}$NHCH$_2$CH$_2$CH$_2$N— <br> $\quad\quad\quad\quad\quad\quad\quad\;$ $\|$ <br> $\quad\quad\quad\quad\quad\quad\quad\;$ CH$_3$ | ZT$_a$ |
| 48 | " | 3 | CH$_3$ | Cl | " | ZT$_c$ |
| 49 | 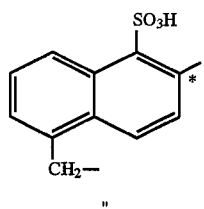 | 3 | H | Cl | —NHCH$_2$CH$_2$CH$_2$NH— | ZT$_a$ |
| 50 | " | 3 | H | F | " | ZT$_b$ |
| 51 | " | 3 | H | Cl | $\overset{*}{-}$NHCH$_2$CHNH— <br> $\quad\quad\quad\quad\quad\;\;$ $\|$ <br> $\quad\quad\quad\quad\quad\;\;$ CH$_3$ | ZT$_a$ |
| 52 | " | 2 | H | Cl | " | " |
| 53 | " | 3 | H | Cl | —NHCH$_2$CHCH$_2$NH— <br> $\quad\quad\quad\quad\quad\;\;$ $\|$ <br> $\quad\quad\quad\quad\quad\;\;$ OH | ZT$_c$ |

In Table 3 below each marked carbon atom in the column under DT$_3$ is bound to the azo group in formula (T3).

TABLE 3
Compounds of formula (T3)
Examples 54–73
| Ex. No. | $Z_d$ | $DT_3$ | position of $-NR_1-$ | $R_1$ | $Z_k$ |
|---|---|---|---|---|---|
| 54 | $ZT_a$ | 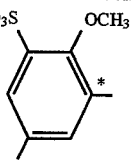 HO₃S, OCH₃ | 2 | H | $ZT_a$ |
| 55 | $ZT_b$ | " | 3 | H | " |
| 56 | $ZT_a$ | " | 3 | CH₃ | $ZT_c$ |
| 57 | " | " | 3 | " | $ZT_a$ |
| 58 | $ZT_a$ | 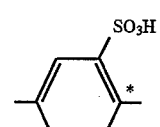 SO₃H | 3 | H | $ZT_a$ |
| 59 | " | " | 3 | CH₃ | " |
| 60 | " | " | 3 | H | $ZT_b$ |
| 61 | $ZT_b$ | " | 2 | H | $ZT_a$ |
| 62 | $ZT_a$ | 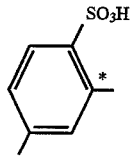 SO₃H | 3 | H | " |
| 63 | $ZT_b$ | " | 3 | CH₃ | " |
| 64 | $ZT_c$ | " | 2 | H | " |
| 65 | $ZT_a$ | 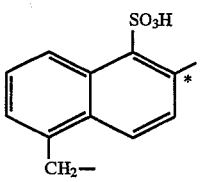 SO₃H | 3 | H | " |
| 66 | " | 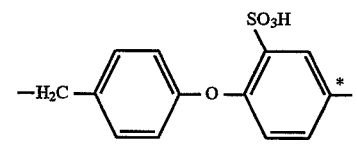 SO₃H | 2 | H | " |
| 67 | " | " | 3 | H | $ZT_b$ |
| 68 | $ZT_a$ | 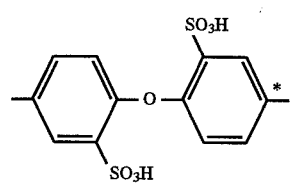 SO₃H, SO₃H | 3 | H | $ZT_a$ |
| 69 | $ZT_b$ | " | 3 | CH₃ | " |
| 70 | $ZT_a$ | 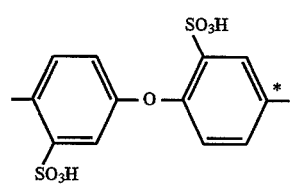 SO₃H, SO₃H | 3 | H | $ZT_a$ |
| 71 | " | " | 3 | CH₃ | " |

TABLE 3-continued

Compounds of formula (T3)
Examples 54–73

| Ex. No. | $Z_d$ | $DT_3$ | position of $-NR_1-$ | $R_1$ | $Z_k$ |
|---|---|---|---|---|---|
| 72 | " | HO₃S—[benzene-CH₃]—O—[benzene-SO₃H]—* | 2 | H | " |
| 73 | " | " | 3 | H | $ZT_2$ |

In Table 4 below each marked carbon atom in the column under $DT_4$ is bound to the azo group in formula (T4); and each marked nitrogen atom in the column under $-W_1-$ is bound to a carbon atom of the triazine ring in formula (T4).

TABLE 4

Compounds of formula (T4)
Examples 74–96

| Ex. No. | $DT_4$ | Hal | $-W_1-$ | $ZT_4$ | position of $-NR_1-$ | $R_1$ |
|---|---|---|---|---|---|---|
| 74 | HO₃S, OCH₃ substituted benzene* | Cl | $-\overset{*}{N}HCH_2CHNH-$<br>           $\|$<br>           $CH_3$ | $ZT_a$ | 3 | H |
| 75 | " | Cl | " | $ZT_b$ | 2 | H |
| 76 | " | Cl | $-NHCH_2CHCH_2NH-$<br>             $\|$<br>             OH | $ZT_a$ | 3 | $CH_3$ |
| 77 | " | Cl | $-\overset{*}{N}HCH_2CH_2CH_2N-$<br>                 $\|$<br>                 $CH_3$ | " | 3 | H |
| 78 | SO₃H, OCH₃ substituted benzene* | Cl | $-\overset{*}{N}HCH_2CH_2CH_2N-$<br>                 $\|$<br>                 $CH_3$ | $ZT_a$ | 3 | $CH_3$ |
| 79 | " | F | " | $ZT_c$ | 3 | H |
| 80 | SO₃H substituted benzene* | Cl | $-NHCH_2CH_2CH_2NH-$ | ZTa | 3 | H |
| 81 | " | Cl | " | $ZT_b$ | 2 | H |
| 82 | " | Cl | piperazine $-N\frown N-$ | $ZT_c$ | 3 | H |
| 83 | " | Cl | " | $ZT_a$ | 3 | H |
| 84 | " | Cl | $-\overset{*}{N}HCH_2CHNH-$<br>           $\|$<br>           $CH_3$ | " | 3 | H |
| 85 | " | F | " | " | 3 | H |

TABLE 4-continued

Compounds of formula (T4)
Examples 74–96

| Ex. No. | DT$_4$ | Hal | —W$_1$— | ZT$_4$ | position of —NR$_1$— | R$_1$ |
|---|---|---|---|---|---|---|
| 86 | " | Cl | —NHCH$_2$CHCH$_2$NH—<br>\|<br>OH | " | 3 | H |
| 87 | " | Cl | " | ZT$_b$ | 3 | H |
| 88 | 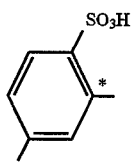 | Cl | —NHCH$_2$CHCH$_2$NH—<br>\|<br>OH | ZT$_a$ | 3 | H |
| 89 | " | Cl | —*NHCH$_2$CHNH—<br>\|<br>CH$_3$ | " | 3 | CH$_3$ |
| 90 | " | Cl | " | " | 2 | H |
| 91 | " | Cl | —*NHCH$_2$CH$_2$CH$_2$N—<br>\|<br>CH$_3$ | ZT$_c$ | 3 | H |
| 92 | " | Cl | " | ZT$_b$ | 2 | H |
| 93 | 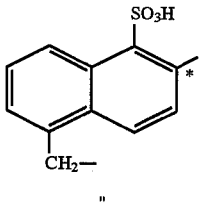 | Cl | —*NHCH$_2$CHNH—<br>\|<br>CH$_3$ | ZT$_a$ | 3 | H |
| 94 | " | Cl | —NHCH$_2$CHCH$_2$NH—<br>\|<br>OH | ZT$_b$ | 3 | H |
| 95 | 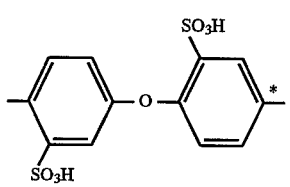 | Cl | " | ZT$_a$ | 3 | H |
| 96 | " | Cl | —*NHCH$_2$CHNH—<br>\|<br>CH$_3$ | ZT$_c$ | 2 | H |

EXAMPLE 97

47.8 Parts of 2-amino-5-hydroxynaphthalene-7-sulphonic acid are reacted with 19.4 parts of 2,4,6-trifluoropyrimidine in accordance with the method described in the first step of Example 1.

The suspension thus obtained is added all at once at 0°–50° to a diazonium salt solution which has been prepared in a conventional manner from 43.4 parts of 2-amino-5-ethoxybenzene sulphonic acid. The pH of the reaction mixture is kept at 7.0–7.5 by the addition of 15% sodium carbonate solution. After coupling is complete, the resultant dyestuff is salted out by the addition of sodium chloride, filtered and dried in vacuo at 50°. The dyestuff has the formula (shown in free acid form)

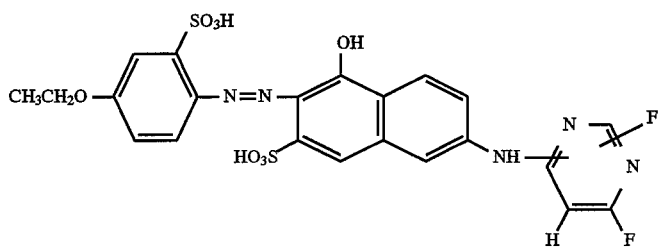

and dyes cotton a scarlet-red shade. These cotton dyeings show good light- and wet-fastness properties and are resistant to oxidative influences.

EXAMPLES 98 TO 108

By analogy with the method described in Example 97, using appropriate starting compounds, further compounds of formula I may be prepared which are listed in Table 5 below. They correspond to the formula (T5)

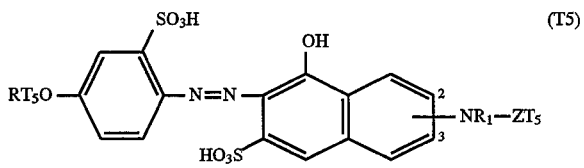

in which the symbols are as defined in Table 5.

In Table 5, in addition to $ZT_a$ which is as defined above, the following symbols $ZT_d$ and $ZT_e$ are used where

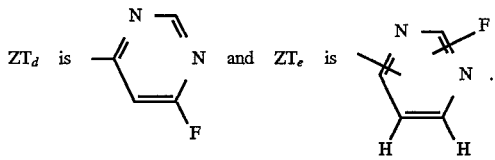

The compounds of Examples 98 to 108 may be applied to substrates which comprise cellulose fibres, and particularly to textile material comprising cotton using the conventional exhaust dyeing method or conventional tional printing processes, where dyeings or prints in orange to scarlet-red shades are obtained. These dyeings and prints on cotton show good light- and wet-fastness properties and are resistant to oxidative influences.

TABLE 5

Compounds of formula (T5)
Examples 98 to 108

| Ex.No. | $RT_5$ | $R_1$ | position of $-NR_1-$ | $ZT_5$ |
|---|---|---|---|---|
| 98 | —CH$_2$CH$_3$ | CH$_3$ | 3 | $ZT_a$ |
| 99 | " | H | 2 | " |
| 100 | " | H | 3 | $ZT_d$ |
| 101 | " | CH$_3$ | 2 | $ZT_a$ |
| 102 | " | " | 3 | $ZT_d$ |
| 103 | " | H | 3 | $ZT_e$ |
| 104 | —CH$_2$CH$_2$OH | H | 2 | $ZT_a$ |
| 105 | —CH$_2$CH$_2$OSO$_3$H | CH$_3$ | 3 | " |
| 106 | " | H | 2 | " |
| 107 | —CH$_2$CH$_2$OCH$_2$CH$_2$OH | H | 3 | " |
| 108 | " | " | H | 2 | " |

By the preparation method described in Example 1, 2 or 97, the compounds of Examples 1–108 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, the exemplified dyestuffs (and the corresponding free acids and other salt forms) contain two isomefic compounds regarding the radical

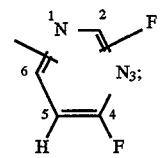

one compound in which the floating fluoro substituent on the pyrimidine ring is in the 2-position and the corresponding compound wherein it is in the 6-position. In an analogous manner the radicals $ZT_b$, $ZT_c$ and $ZT_e$ are also present in two appropriate isomeric forms with respect to the floating chloro or fluoro substituent. The obtained mixtures of isomeric dyestuffs may be used in conventional dyeing or printing processes; the isolation of a single isomer for use normally is unnecessary.

In the following examples, the application of the compounds of this invention is illustrated.

APPLICATION EXAMPLE A 0.3 Part of the dyestuff of Example 1 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is kept at 50°. Subsequently, the dyebath is heated to 60°, and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A deep-orange cotton dyeing is obtained showing good fastness properties, and particularly high light- and wet-fastness properties, which is stable towards offdative influences.

APPLICATION EXAMPLE B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 1 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying a deep-orange cotton dyeing is obtained which has the same good fastness properties as indicated in Application Example A.

Similarly, the dyestuffs of Examples 2–108 or mixtures of the exemplified dyestuffs may be employed to dye cotton in accordance with the method described in Application Example A or B. The cotton dyeings thus obtained are orange to scarlet and show good fastness properties.

APPLICATION EXAMPLE C

| A printing paste consisting of |
| --- |
| 40 parts of the dyestuff of Example 1 |
| 100 parts of urea |
| 350 parts of water |
| 500 parts of a 4% sodium alginate thickener and |
| 10 parts of sodium bicarbonate |
| 1000 parts in all | is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. An orange print is obtained which has good general fastness properties.

Similarly, the dyestuffs of Examples 2 to 108 or mixtures of the exemplified dyestuffs may be employed to print cotton in accordance with the method given in Application Example C. All prints obtained are orange to scarlet and show good fastness properties.

What is claimed is:
1. A compound of formula I

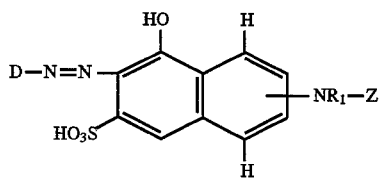

or a salt thereof, or a mixture of such compounds or salts, in which each $R_1$ is independently hydrogen, $C_{1-4}$ alkyl or substituted $C_{1-4}$ alkyl monosubstituted with a group selected from hydroxy, cyano, or chloro D is one of the radicals (a) to (f),

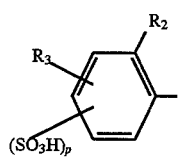 (a)

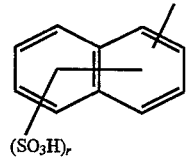 (c)

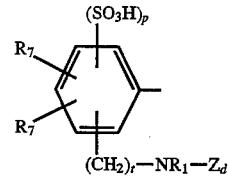 (d)

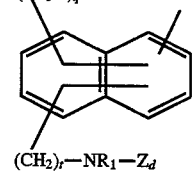 (e)

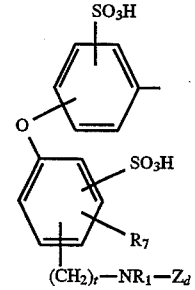 (f)

in which $R_2$ is hydrogen, or $C_{1-4}$ alkyl, $R_3$ is hydrogen, $C_{1-4}$ alkyl, carboxy or $-O-A_1-OR_4$, $A_1$ is $C_{2-4}$ alkylene, $R_4$ is hydrogen, sulpho, $C_{1-4}$ alkyl or $C_{2-4}$ hydroxyalkyl, $R_5$ is $C_{2-4}$ alkyl, $R_6$ is hydrogen or sulpho, and each $R_7$ is independently hydrogen, $C_{1-4}$ alkyl, $C_{1-4}$ alkoxy or carboxy;

each p is 0, 1 or 2, q is 1 or 2, r is 1, 2 or 3, and each t is 0 or 1;

each of Z and $Z_4$ is independently $(z_1)$, $(z_2)$ or $(z_3)$,

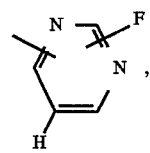 $(z_1)$

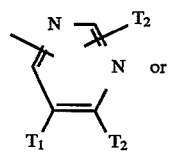 $(z_2)$

-continued

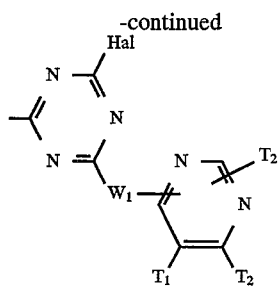 (z₃)

in which

T₁ is hydrogen, or cyano, the two T₂'s are the same and each T₂ is fluoro or chloro, Hal is fluoro or chloro, and W₁ is —NR₁—B₁—NR₁—

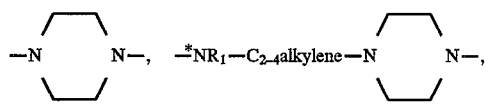

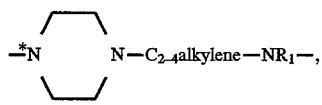

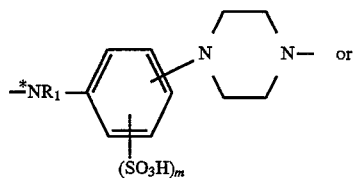

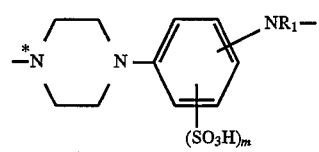

wherein
each m is independently 0 or 1 and the marked nitrogen atom is bound to a carbon atom of the triazine ring, B₁ is $C_{2-4}$alkylene; —$C_{2-3}$alkylene—Q—$C_{2-3}$alkylene— in which Q is —O— or —NR₁—; $C_{3-4}$alkylene monosubstituted by hydroxy,

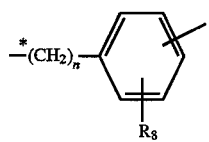

or

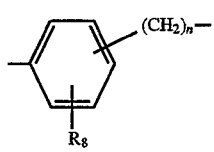

in which
n is 0 or an integer 1 to 4,
R₈ is hydrogen, $C_{1-4}$alkyl, $C_{1-4}$alkoxy, carboxy or sulpho, and the marked carbon atom is attached to the —NR₁ group which is bound to a carbon atom of the triazine ring;

with the provisos that
(i)

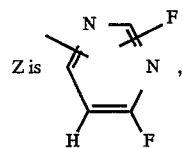

when D is a radical (a) or (c);

(ii) Z is (z₁) or (z₂), when D is a radical (b); and (iii) each of Z and $Z_d$ is independently (z₂) or (z₃), when D is a radical (d), (e) or (f), and at least one of Z and $Z_d$ is

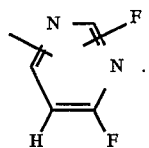

2. A compound according to claim 1, in which each R₁ is $R_{1a}$, where each $R_{1a}$ is independently hydrogen, methyl, ethyl or 2-hydroxyethyl.

3. A compound according to claim 1, which corresponds to formula Ia,

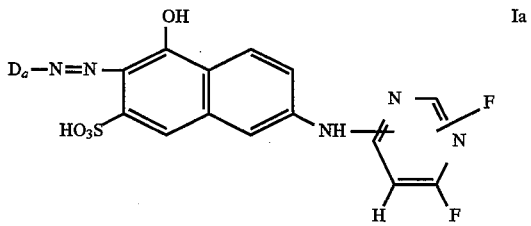

or a salt thereof, in which $D_a$ is a radical (a') or (c'),

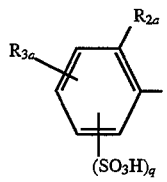 (a')

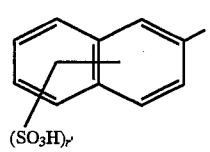 (c')

in which $R_{2a}$ is hydrogen or methyl, $R_{3a}$ is hydrogen, methyl, carboxy or —O—$A_1'$—$OR_{4a}$, wherein $A_1'$ $C_{2-3}$-alkylene and $R_{4a}$ is hydrogen, sulpho, methyl, ethyl or $C_{2-3}$hydroxyalkyl;

q is 1 or 2, and r' is 2 or 3.

4. A compound according to claim 1, which corresponds to formula Ic,

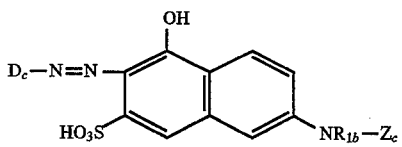

or a salt thereof, in which $D_c$ is a radical (d'), (e') or (f'),

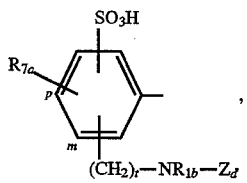  (d')

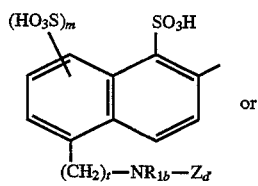  or  (e')

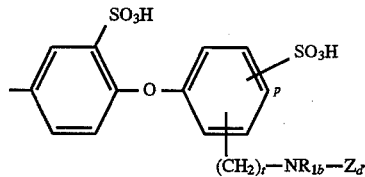  (f')

wherein $R_{7a}$ is hydrogen, methyl or methoxy, m is 0 or 1, t is 0 or 1, and the radical —$(CH_2)_t$—$NR_{1b}$—$Z_d'$ in (d') is in the meta- or para-position to the azo group, and that in (f') is in the meta- or para-position to —O—;

each $R_{1b}$ is independently hydrogen or methyl, each of $Z_c$ and $Z_d'$ is independently a radical ($z_2$) or ($z_3'$), where ($z_2$) is as defined in claim 1 and ($z_3'$) is of the formula

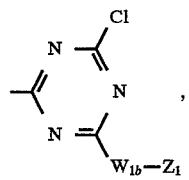  ($z_3'$)

wherein $Z_1$ is a radical ($z_2$), and $W_{1b}$ is —$NR_{1b}$—$B_{1b}$—$NR_{1b}$— or

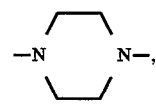

in which $B_{1b}$ is $C_{2-3}$alkylene, —$CH_2CH_2$—$NR_{1b}$—$CH_2CH_2$—,

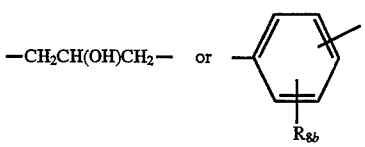

and $R_{8b}$ is hydrogen or sulpho, with the proviso that at least one of $Z_c$ and

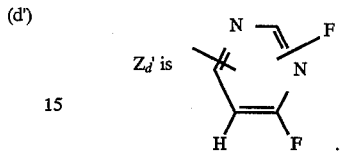

5. A compound according to claim 4, in which $R_{1b}$ is hydrogen.

6. A compound according to claim 4, in which $Z_c$ is $Z_c'$ and $Z_d'$ in (d'), (e') and (f') is $Z_d''$, where each of $Z_c'$ and $Z_d''$ is a radical ($z_2'$), ($z_2''$) or ($z_3''$)

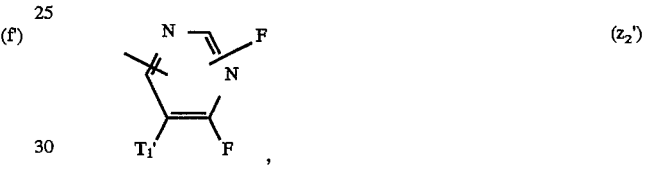  ($z_2'$)

  ($z_2''$)

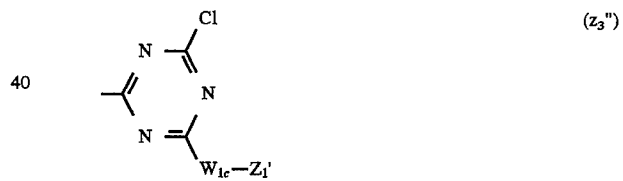  ($z_3''$)

in which $T_1'$ is hydrogen or chloro, $W_{1c}$ is —NH—$B_{1c}$—NH— wherein $B_{1c}$ is —$CH_2CH_2$—, —$CH_2CH_2CH_2$—, —*$CH_2CH(CH_3)$— or —$CH_2CH(OH)CH_2$—, in which the marked carbon atom is bound to the —$NR_1$ group which is attached to a carbon atom of the triazine ring, and $Z_1'$ is a radical ($z_2'$) or ($z_2''$).

7. A compound according to claim 4, in which one of $Z_c$ and

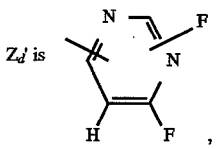

and the other is a radical ($z_3'$).

8. A compound according to claim 7, in which ($z_3'$) is a radical ($z_3''$)

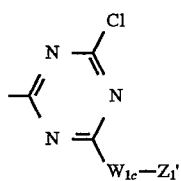 (z₃")

in which $W_{1c}$ is —NH—$B_{1c}$—NH— wherein $B_{1c}$ is —CH₂CH₂—, —CH₂CH₂CH₂—, —*CH₂CH(CH₃)— or —CH₂CH(OH)CH₂—, in which the marked carbon atom is bound to the —NR₁ group which is attached to a carbon atom of the triazine ring, and $Z_1'$ is a radical ($z_2'$) or ($z_2''$)

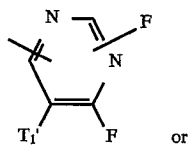 (z₂') or

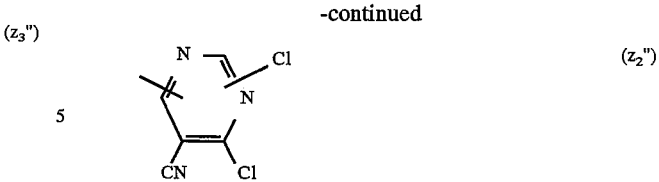 (z₂")

wherein $T_1''$ is hydrogen or chloro.

9. A process for dyeing or printing a hydroxy group- or nitrogen-containing organic substrate comprising applying to the substrate a compound according to claim 1, or a mixture thereof.

10. A process according to claim 9, wherein the substrate is a fibre material comprising natural or regenerated cellulose.

11. A compound of claim 1 wherein Z is ($z_2$) or ($z_3$).

* * * * *